US011449158B2

(12) United States Patent
James et al.

(10) Patent No.: US 11,449,158 B2
(45) Date of Patent: Sep. 20, 2022

(54) INTERACTIVE, TOUCH-SENSITIVE USER INTERFACE DEVICE

(75) Inventors: Dwayne R. James, Peterborough (CA); William G. O'Farrell, Markham (CA); Alexander S. Ross, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1550 days.

(21) Appl. No.: 11/617,553

(22) Filed: Dec. 28, 2006

(65) Prior Publication Data
US 2008/0158166 A1    Jul. 3, 2008

(51) Int. Cl.
*G06F 3/039*    (2013.01)
*G06F 3/0354*    (2013.01)

(52) U.S. Cl.
CPC ........ *G06F 3/0395* (2013.01); *G06F 3/03544* (2013.01)

(58) Field of Classification Search
CPC ....... G09G 5/00; G09F 3/041; G09F 3/04888; G09F 3/04886
See application file for complete search history.

(56) References Cited

U.S. PATENT DOCUMENTS

| | | | | |
|---|---|---|---|---|
| 5,529,501 A | * | 6/1996 | Maruyama | 434/408 |
| 5,831,597 A | * | 11/1998 | West | G06F 3/0395 |
| | | | | 345/156 |
| 5,973,676 A | * | 10/1999 | Kawakura | 345/173 |
| 6,037,928 A | * | 3/2000 | Nachinson | G06F 3/02 |
| | | | | 345/156 |
| 6,037,930 A | | 3/2000 | Wolfe et al. | |
| 6,154,210 A | * | 11/2000 | Anderson | 715/840 |
| 6,445,378 B1 | * | 9/2002 | Flagg | G06F 3/0227 |
| | | | | 345/156 |
| 6,529,189 B1 | | 3/2003 | Colgan et al. | |
| 6,738,049 B2 | * | 5/2004 | Kiser | G06F 3/0488 |
| | | | | 345/172 |
| 6,989,814 B1 | | 1/2006 | Mattson | |
| 7,006,077 B1 | * | 2/2006 | Uusimaki | 345/173 |
| 8,089,470 B1 | * | 1/2012 | Schediwy et al. | 345/173 |
| 2001/0013855 A1 | * | 8/2001 | Fricker et al. | 345/156 |
| 2002/0044134 A1 | * | 4/2002 | Ericson et al. | 345/163 |
| 2002/0080123 A1 | * | 6/2002 | Kennedy et al. | 345/173 |
| 2002/0109665 A1 | * | 8/2002 | Matthews | G06F 1/1601 |
| | | | | 345/156 |

(Continued)

FOREIGN PATENT DOCUMENTS

WO    WO 02099616 A2    12/2002

OTHER PUBLICATIONS

Microsoft Corporation, Halo Combat Evolved, 2003 (Year: 2003).*

*Primary Examiner* — Kenneth Bukowski
(74) *Attorney, Agent, or Firm* — Edell, Shapiro & Finnan, LLC

(57) ABSTRACT

Some aspects of the invention provide an interactive, touch-sensitive user interface device. A user interface device for a data processing system is provided, which includes a sensor having a surface configured to contactingly receive a pointing device and further configured to detect physical contact by a living human and to differentiate between said physical contact and movement of the pointing device when the pointing device is engaged with the surface. The user interface device is operable to transmit information corresponding to said physical contact to the data processing system.

20 Claims, 3 Drawing Sheets

(56) References Cited

U.S. PATENT DOCUMENTS

| | | | |
|---|---|---|---|
| 2003/0025678 A1* | 2/2003 | Lee et al. .................... | 345/173 |
| 2003/0197687 A1* | 10/2003 | Shetter ............... | G06F 3/04886 |
| | | | 345/173 |
| 2004/0155871 A1* | 8/2004 | Perski .................... | G06F 3/041 |
| | | | 345/174 |
| 2004/0178994 A1 | 9/2004 | Kairls, Jr. | |
| 2006/0012581 A1* | 1/2006 | Haim .................... | G06F 3/041 |
| | | | 345/173 |
| 2007/0013662 A1* | 1/2007 | Fauth .................... | G06F 3/016 |
| | | | 345/168 |

\* cited by examiner

INTERACTIVE, TOUCH-SENSITIVE USER INTERFACE DEVICE

FIELD OF THE INVENTION

The invention relates to a user interface device, in particular, to an interactive, touch-sensitive user interface device.

BACKGROUND OF THE INVENTION

The use of computers has become ubiquitous in the day-to-day life of modern society. One particular advantageous use of computers is in navigating, or "surfing" the Internet, other such uses include word processing, desktop publishing, spreadsheet creation and video and audio media (among others). Yet the interaction between human and machine continues to be a subject of development.

Of particular prevalence as a human-machine interface device is the mouse. The use of a mouse is facilitated by the employment of a mousepad, upon which a mouse is operated. Typically a human user grasps the mouse and moves it glidingly over the surface of the mousepad in a planar fashion. At least one button and, in certain mouse embodiments, a wheel (or trackball) located on the mouse, provides additional means for commands to be issued to the computer.

Surfing the Internet is not very ergonomically economic when using a standard keyboard and mouse (plus a mouse pad). Typically, browsing the Internet requires that the user move backwards and forwards between web pages, and minimize and/or close the various browser windows that get launched in the process. To do this using a mouse means that the user has to sweep the pointer all over the graphical user interfaced (GUI) on the screen, and then click what is more often than not a relatively small target on the screen (as translated into mouse movement). Keyboard shortcuts are often confusing, complicated, and not all that easy to execute (for example, in certain configurations, to go back to a preceding web page, a user must hold the ALT key and tap the left arrow key, to close the active window, the user has to hit the awkward combination of ALT-F4). Similar difficulties can arise when using a keyboard and mouse to control programs other than web browsers, such as word processing software, presentation slide creation software and other types of software.

U.S. Pat. No. 6,037,930 issued to Wolfe et al. discloses a touch sensitive intelligent multimodal peripheral device which includes a touch sensitive pad to which the operator applies a light pressure in a prescribed manner to effect cursor movement on a CRT screen or to input data to a computer. The device has four operating modes which are defined as the mouse mode, the absolute mode, the joystick mode and the numeric keypad mode. However, this is used as a standalone device, which does not permit the combinational use of a mouse or pointing device with its additional features such as buttons and rotary dials.

SUMMARY OF THE INVENTION

The present invention provides a user interface device and a mousepad. More specifically, this invention provides a user interface device and a mousepad, which are interactive and touch sensitive.

In a preferred embodiment of this invention, a user interface device for a data processing system is provided, comprising a sensor having a surface configured to contactingly receive a pointing device and further configured to detect physical contact by a living human and to differentiate between said physical contact and movement of the pointing device when the pointing device is engaged with the surface, wherein the user interface device is operable to transmit information corresponding to said physical contact to the data processing system.

In accordance with one aspect of the invention, the pointing device is a mouse and the user interface device is a mouse pad.

In accordance with another aspect of the invention, information is transmitted to the data processing system by wireless means.

In accordance with a further aspect of the invention, the surface comprises a plurality of surface regions and the information corresponding to said physical contact and transmitted to the data processing system comprises information to identify the specific surface region receiving the physical contact.

In one variation to the above, each of the plurality of surface regions corresponds to a command issued to a software application running on the data processing system.

In another variation to the above, each surface region in the plurality of surface regions is associated with a predefined permanent sensor region.

In a further variation to the above, each surface region in the plurality of surface regions is associated with one of a plurality of sensor regions that have been dynamically defined based on a software application in association with which the user interface device is to be used.

In another embodiment of this invention, A mouse pad for a data processing system is provided, comprising a sensor having a surface configured to contactingly receive a mouse and further configured to detect physical contact by a living human and to differentiate between said physical contact and movement of the mouse when the mouse is engaged with the surface, wherein the mouse pad is operable to transmit information corresponding to said physical contact to the data processing system.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION

Embodiments of the present invention provide for an interactive, touch-sensitive user interface device. The device is designed to be used in conjunction with a pointing device, such as a mouse.

Figure 1A:
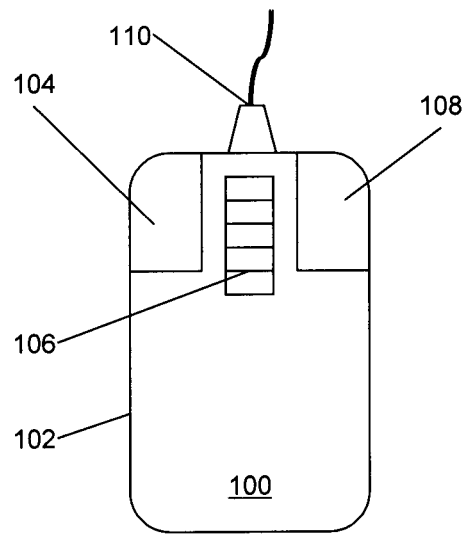
FIG. 1A is a pictorial representation of the topside view of an exemplary pointing device in conjunction with which aspects of the present invention may be implemented.

FIG. 1a is a pictorial representation of the topside view of a typical pointing device 100 (a mouse in this case) in conjunction with which aspects of the present invention may be implemented. The mouse 100 includes a casing 102, which permits the mouse to be manually manipulated as a whole and encloses electronic, mechanical and/or optical mechanisms (not shown) for generating and sending a positional signal. The mouse further includes a rotary dial 106, and left and right clicking buttons 104 108, all for receiving user input to be transmitted to a computer (not shown). A cable assembly 110 connects the electronic, mechanical and/or optical mechanisms to the computer. The cable assembly 110 may include a USB cable. The use of a cable assembly 110 is optional as the positional signal may be transmitted by wireless means also, such as Bluetooth. It is to be appreciated that the particular mouse shown in FIGS. 1a and 1b is exemplary only, and that many other mouse configurations may be used in association with aspects of the present invention.

Figure 1B:
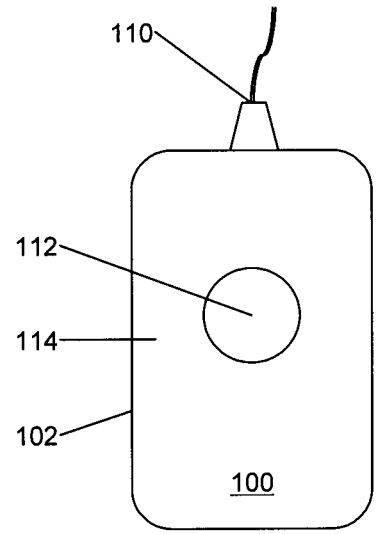
FIG. 1B is a pictorial representation of the bottom-side view of the pointing device of FIG. 1A.

FIG. 1B is a pictorial representation of the bottom-side view of the mouse 100 showing bottom surface 114. In additional to the cable 110 and casing 102 discussed above, a movement sensor 112 is partially shown. The movement sensor 112 may be an optical sensor, a mouse ball coupled with mechanical X-Y position sensors, or any other suitable sensor. A user can move the mouse 100 in any planar direction, by sliding it on its bottom surface 114 along a substantially flat surface (such as a mouse pad), with such planar movement being detected by the movement sensor 112 and then transmitted to the computer with which the mouse 100 is associated.

Figure 2:
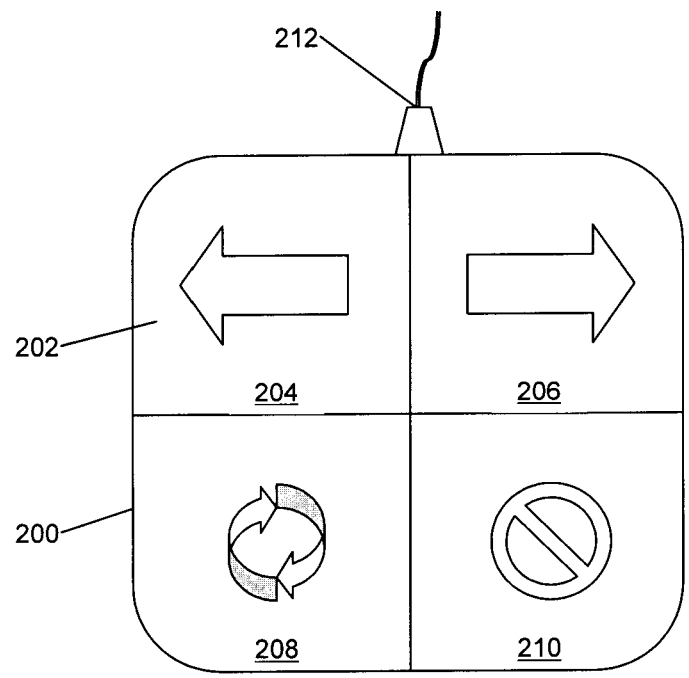
FIG. 2 is a pictorial representation of the topside view of a preferred embodiment of an aspect of this invention.

FIG. 2 is a pictorial representation of the topside view of a preferred embodiment of an aspect of this invention, which provides for a user interface 200 used in conjunction with a pointing device such as mouse 100 illustrated in FIGS. 1 and 2. An optional cable assembly 212 connects the user interface 200 with a computer (not shown); alternatively a wireless form of communication may be used. The planar surface 202 of the user interface 200 has an associated sensor array. In some exemplary embodiments, the user interface device 200 may be configured so that it has certain predefined permanent sensor regions; in other exemplary embodiments, the user interface device may be configured to enable sensor regions to be dynamically defined.

Figure 3:
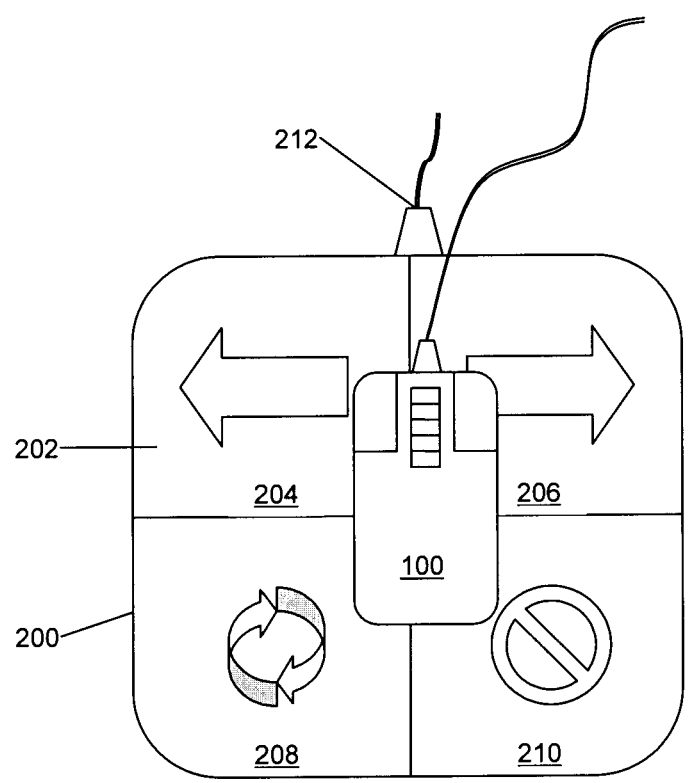
FIG. 3 is a pictorial representation of the topside view of the particular preferred embodiment shown in FIG. 2 having the pointing device of FIGS. 1A and 1B placed atop thereof for illustrating how the two devices may be juxtaposed when used in combination.
Figure 4:
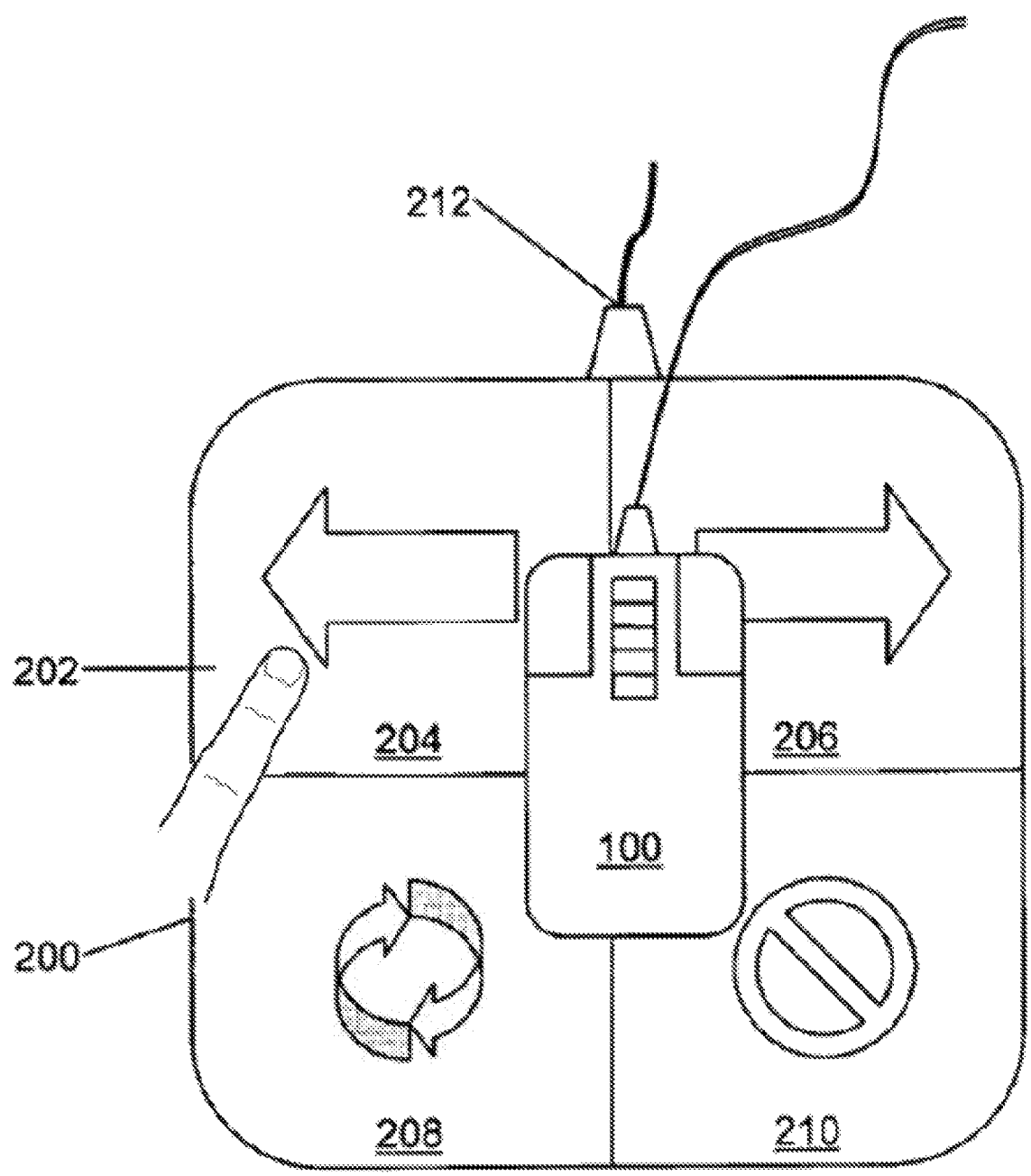
FIG. 4 is another pictorial representation of the topside view of an exemplary embodiment.

FIG. 3 is a pictorial representation of the topside view of a particular preferred embodiment of an aspect of this invention, which provides for a user interface 200 as shown in FIG. 2 having the pointing device 100 of FIGS. 1A and 1B placed atop thereof for illustrating how the two devices may be juxtaposed when used in combination by a human. The surface 202 of the user interface 200 is configured to detect a touch by a living human and to differentiate between said physical contact and movement of the pointing device 100 when the pointing device 100 is engaged with the surface (see FIG. 4). The user interface device 200 is operable to transmit information corresponding to said physical contact to the data processing system by the optional cable assembly 212 (wireless connection is also contemplated with a wireless transmitter built inside, or otherwise associated with, the user interface device 200).

It will be clear to a person skilled in the art, once informed by this disclosure, that a variety of technologies exist which can permit the user interface 200 to differentiate between a human physical contact with the surface 202 and engagement of the pointing device 100 with the surface 202. One option is the use of thermal detectors; another is to use a detector for detecting the signature electrical signal generated by a human touch. Moreover, any suitable technology, whether now extant or developed in the future, may be used for the purpose of differentiating between a human physical contact with the surface 202 and engagement of the pointing device 100 with the surface 202.

The user interface device 200 is configured also to locate the precise place where the human contact occurred. This location information may be used to identify the surface regions within which the contact took place, whether through electronic means being part of the user interface device 200 or software means (such as a device driver for the user interface device 200) at the computer where the location information is transmitted by the optional cable assembly 212 (or by wireless means). The installed device driver can use the location information to issue commands corresponding to the surface regions. In FIGS. 2 and 3, a human touch within the surface region 204 marked with the left arrow results in the issuance of a Back command to an Internet browser; a human touch within the surface region 206 marked with the right arrow results in the issuance of a Forward command to an Internet browser; a human touch within the surface region 208 marked with the circular double arrows results in the issuance of a Refresh command to an Internet browser; and a human touch within the surface region 210 marked with the stop sign results in the issuance of a Stop command to an Internet browser. As a result, with the tap of a finger (or any hand part), a user would be able to move forward and backwards in a web browser, and even issue other commands, while at the same time be able to use the mouse with all its fine movement control, button(s) and possibly rotary dial or trackball. With the enhanced mouse pad, the user would have more control using a single hand, and not have to move the mouse pointer all over the window. Other possible commands may include a Minimize/Maximize command to a Windows®-based application and a Close command to the Windows-based application.

As was noted above, in some exemplary embodiments, the user interface device 200 may be configured so that the surface 202 has associated therewith certain predefined permanent sensor regions. In such a case, and where the user interface device 200 is intended for use only with one or a few computer program, these predefined sensor regions may be associated with a graphical surface overlay associating icons (such as the Back and Forward arrows and the Refresh and Stop icons) with the particular sensor regions (such as regions 204, 206, 208 and 210). Where use with more than one type of computer program is contemplated, the user interface device 200 may be configured to permit multiple graphical overlays (e.g. made of paper or thin plastic) to be interchanged by the user, depending on the program being used. Thus, the various sensor regions would, when activated, perform different functions depending on the program in association with which the user interface device 200 is being used. It will thus be appreciated that, in such an embodiment, the arrangement of icons and regions shown in FIGS. 2 and 3 would be merely one example of a graphical overlay (in this case used for Internet navigation), and other graphical overlays could be used for other programs. It will also be appreciated that any configuration involving a graphical overlay must be arranged so that the overlay does not interfere with the sensing of human contact.

Alternatively, the surface 202 of the user interface device 200 may be configured to present a dynamic graphical display (e.g. a liquid crystal display), so that the icons shown (and associated with the sensor regions) may be varied dynamically, and preferably automatically depending on the computer program being used. The use of a dynamic graphical display may be particularly advantageously used with embodiments in which the user interface device 200 is configured to enable sensor regions to be dynamically defined; in such embodiments, a particular arrangement of sensor regions, with associated graphical icons, may be defined for a particular program and this combined graphical/sensor region arrangement may be automatically varied depending on the program in association with which the user input device 200 is being used. In such an embodiment, the arrangement of icons regions 204, 206, 208 and 210 shown in FIG. 2 would simply be one of a virtually infinite number of possible sensor/graphical icon arrangements.

Using any of the above-described arrangements, a user interface device according to aspects of the present invention may be used to facilitate control of any number of different types of computer programs, including (but not limited to) Internet browsing programs, word processing programs, desktop publishing programs, database programs, spreadsheet programs, presentation slide programs, games programs, audio and video media playback programs, compiler and debugging programs, and security programs.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above teachings.

What is claimed is:

1. A user interface system for a data processing system, comprising:
a pointing device including a mouse; and
a sensor device that operates in conjunction with the pointing device to provide a set of user interface application-level controls to the data processing system, wherein the sensor device comprises a touch sensitive surface as an entire top side of the sensor device for engaging with the pointing device and the surface is a liquid crystal display, and wherein the pointing device is disposed on the liquid crystal display;
where the sensor device comprises a two-dimensional sensor array comprising a plurality of sensors dynamically configured into a plurality of adjoining sensor regions that together define an entirety of the surface of the sensor device for detecting physical contact by a living human, and where each location on the surface of the sensor device is associated with one of the plurality of sensor regions;
where, responsive to detecting a first contact at any location on the surface of the senor device from the physical contact by the living human when the pointing device is simultaneously engaged with the surface liquid crystal display of the sensor device, the sensor device is operable to transmit first information including the location of the first contact indicating the set of user interface application-level controls corresponding to the one of the plurality of sensor regions of the location of the first contact, via a first communication link through the sensor device, to the data processing system that causes the data processing system to perform a first application control operation in a software application currently being used on the data processing system, and where the data processing system is located separately from the sensor device;
where the pointing device is configured to directly transmit second information indicating the set of user interface application-level controls to the data processing system, via a second communication link, that causes the data processing system to perform a second application control operation, initiated by manipulation of the pointing device on the liquid crystal display of the sensor device, in the software application currently being used on the data processing system; and
where each of the plurality of sensor regions respectively corresponds to, and upon receiving the physical contact by the living human causes issuance of, one of a plurality of application-level commands of the data processing system that are each dynamically modifiable by a user according to the software application currently being used on the data processing system.

2. The user interface system of claim 1, where:
the sensor device is a mouse pad; and where the sensor device further:
receives, from the data processing system, an indication of a change from the software application currently being used to a different software application currently being used on the data processing system; and
dynamically reconfigures the two-dimensional sensor array into an updated plurality of sensor regions and dynamically modifies the plurality of application-level commands of the data processing system that correspond to the updated plurality of sensor regions according to user-specified application-level commands available within the different software application currently being used on the data processing system.

3. The user interface system of claim 1, where the first information is transmitted to the data processing system by wireless means.

4. The user interface system of claim 1, where:
the first information corresponding to the physical contact by the living human and transmitted to the data processing system comprises information to identify a specific sensor region receiving the physical contact; and
the second information comprises at least one of movement information and movement direction information related to movement of the pointing device.

5. The user interface system of claim 1, where at least one sensor region of the plurality of sensor regions comprises a predefined permanent sensor region.

6. The user interface system of claim 1, where at least one sensor region comprises a plurality of sensor sub-regions that have been dynamically defined according to the software application currently being used on the data processing system.

7. The user interface system of claim 1, where an arrangement of each of the plurality of sensor regions is dynamically defined based on the software application currently being used on the data processing system.

8. The user interface system of claim 1, where, for each of the plurality of sensor regions, the liquid crystal display displays a respective graphical icon that corresponds to a respective one of the plurality of application-level commands issued to the software application currently being used on the data processing system responsive to a respective physical contact by the living human on a respective one of the plurality of sensor regions.

9. The user interface system of claim 1, where the plurality of sensors in the two-dimensional sensor array detect the first contact from the physical contact by the living human using an electrical signal detector which detects a signature electrical signal generated by the physical contact of the living human or thermal detectors.

10. The user interface system of claim 1, where the plurality of sensor regions defining the surface of the sensor device respectively correspond to and initiate web browser commands that control a web browser, where the web browser commands further comprise a set of commands selected from a group consisting of a back command, a forward command, a refresh command, a stop command, a maximize command, a minimize command, and a close command.

11. A mouse pad-based user interface system for a data processing system, comprising:
   a mouse; and
   a mouse pad that operates in conjunction with the mouse to provide a set of user interface application-level controls to the data processing system, wherein the mouse pad comprises a touch sensitive surface as an entire top side of the mouse pad for engaging with the mouse and the surface is a liquid crystal display, and wherein the mouse is disposed on the liquid crystal display;
   where the mouse pad comprises a two-dimensional sensor array comprising a plurality of sensors dynamically configurable into a plurality of adjoining sensor regions that together define an entirety of the surface of the mouse pad for detecting physical contact by a living human, and where each location on the surface of the mouse pad is associated with one of the plurality of sensor regions;
   where, responsive to detecting a first contact at any location on the surface of the mouse pad from the physical contact by the living human when the mouse is simultaneously engaged with the liquid crystal display of the mouse pad, the mouse pad is operable to transmit first information including the location of the first contact indicating the set of user interface application-level controls corresponding to the one of the plurality of sensor regions of the location of the first contact, via a first communication link through the mouse pad, to the data processing system that causes the data processing system to perform a first application control operation in a software application currently being used on the data processing system, and where the data processing system is located separately from the mouse pad;
   where the mouse is configured to directly transmit second information indicating the set of user interface application-level controls to the data processing system, via a second communication link, that causes the data processing system to perform a second application control operation, initiated by manipulation of the mouse on the liquid crystal display of the mouse pad, in the software application currently being used on the data processing system; and
   where each of the plurality of sensor regions respectively corresponds to, and upon receiving the physical contact by the living human causes issuance of, one of a plurality of application-level commands of the data processing system that are each dynamically modifiable by a user according to the software application currently being used on the data processing system.

12. The mouse pad-based user interface system of claim 11, where the first information is transmitted to the data processing system by wireless means.

13. The mouse pad-based user interface system of claim 11, where:
   the first information corresponding to the physical contact by the living human and transmitted to the data processing system comprises information to identify a specific sensor region receiving the physical contact; and
   the second information comprises at least one of movement information and movement direction information related to movement of the mouse.

14. The mouse pad-based user interface system of claim 11, where at least one sensor region of the plurality of sensor regions comprises a predefined permanent sensor region.

15. The mouse pad-based user interface system of claim 11, where at least one sensor region comprises a plurality of sensor sub-regions that have been dynamically defined according to the software application currently being used on the data processing system.

16. A user interface system for a data processing system, comprising:
   a pointing device including a mouse; and
   a sensor device that operates in conjunction with the pointing device to provide a set of user interface application-level controls to the data processing system, wherein the sensor device comprises a touch sensitive surface as an entire top side of the sensor device for engaging with the pointing device and the surface is a liquid crystal display, and wherein the pointing device is disposed on the liquid crystal display;
   where the sensor device comprises a two-dimensional sensor array comprising a plurality of sensors dynamically configured into a plurality of adjoining sensor regions that together define an entirety of the surface of the sensor device for detecting physical contact by a living human, and where each location on the surface of the sensor device is associated with one of the plurality of sensor regions;
   where, responsive to detecting a first contact at any location on the surface of the sensor device from the physical contact by the living human when the pointing device is simultaneously engaged with the liquid crystal display of the sensor device, the sensor device is operable to transmit first information including the location of the first contact indicating the set of user interface application-level controls corresponding to the one of the plurality of sensor regions of the location of the first contact, via a first communication link through the sensor device, to the data processing system that causes the data processing system to perform a first application control operation in a software application currently being used on the data processing system, and where the data processing system is located separately from the sensor device;
   where the pointing device is configured to directly transmit second information indicating the set of user interface application-level controls to the data processing system, via a second communication link, based on manipulation of the pointing device on the liquid crystal display of the sensor device;
   where an arrangement of each of the plurality of sensor regions is dynamically defined based on a software application currently being used on the data processing system; and
   where each of the plurality of sensor regions respectively corresponds to, and upon receiving the physical contact by the living human causes issuance of, one of a plurality of application-level commands of the data processing system that are each dynamically modifiable by a user according to the software application currently being used on the data processing system.

17. A method of providing, via a user interface system, a set of user interface application-level controls to a data processing system, wherein the user interface system comprises a mouse pad that operates in conjunction with a mouse and the mouse pad comprises a touch sensitive surface as an entire top side of the mouse pad for engaging with the mouse and the surface is a liquid crystal display, wherein the mouse is disposed on the liquid crystal display and the mouse pad further comprises a two-dimensional sensor array comprising a plurality of sensors dynamically configured into a plurality of adjoining sensor regions that together define an entirety of the surface of the mouse pad for detecting physical contact by a living human, and where each location on the surface of the mouse pad is associated with one of the plurality of sensor regions, and wherein the method of providing the set of user interface application-level controls to the data processing system comprises:

detecting a contact at any location on the surface of the mouse pad from the physical contact by the living human when the mouse is simultaneously engaged with the liquid crystal display of the mouse pad;

transmitting first information including the location of the contact indicating a set of user interface application-level controls corresponding to the one of the plurality of sensor regions of the location of the contact via a first communication link through the mouse pad to the data processing system that causes the data processing system to perform a first application control operation in a software application currently being used on the data processing system, and where the data processing system is located separately from the mouse pad; and directly transmitting second information indicating the set of user interface application-level controls from the mouse to the data processing system, via a second communication link, that causes the data processing system to perform a second application control operation initiated by manipulation of the mouse on the liquid crystal display of the mouse pad;

where each of the plurality of sensor regions respectively corresponds to, and upon receiving the physical contact by the living human causes issuance of, one of a plurality of application-level commands of the data processing system that are each dynamically modifiable by a user according to the software application currently being used on the data processing system.

18. The method of claim 17, further comprising wirelessly transmitting the first information corresponding to the physical contact by the living human from the mouse pad to the data processing system.

19. The method of claim 17, where the second information corresponding to the operation initiated by the mouse comprises at least one of movement information and movement direction information related to movement of the mouse.

20. The method of claim 17, where the first application control operation is performed while at the same time enabling the second application control operation to be initiated by manipulation of the mouse on the liquid crystal display of the mouse pad.

* * * * *